United States Patent
Manfroy et al.

[11] 3,719,748
[45] March 6, 1973

[54] METHOD FOR CLARIFYING TITANIUM SULPHATE SOLUTIONS

[76] Inventors: Willy Manfroy, 49 Neudorfstrasse, Horgen, Switzerland; Kurt Adolf Fleig, 7495 S.W. 105 Terrace, Miami, Fla.

[22] Filed: Nov. 2, 1970

[21] Appl. No.: 86,337

[30] Foreign Application Priority Data

Nov. 5, 1969  Great Britain.....................54,285/69

[52] U.S. Cl. .................423/544, 423/558, 423/610, 210/54
[51] Int. Cl. ....C01g 23/00, C01g 23/04, C01g 49/14
[58] Field of Search ...............23/117; 209/5; 210/54; 423/544, 566, 659, 610, 615, 558

[56] References Cited

UNITED STATES PATENTS

| | | | |
|---|---|---|---|
| 2,831,841 | 4/1958 | Jones | 210/54 UX |
| 2,767,053 | 10/1956 | Griffin et al. | 23/117 |
| 3,507,847 | 4/1970 | Williams et al. | 210/54 X |
| 3,503,946 | 3/1970 | Scanley et al. | 210/54 X |
| 3,488,720 | 1/1970 | Nagy et al. | 210/54 |
| 3,147,218 | 9/1964 | Booth et al. | 210/54 |

FOREIGN PATENTS OR APPLICATIONS

| | | | |
|---|---|---|---|
| 1,570,656 | 6/1969 | France | 23/202 R |
| 1,184,053 | 3/1970 | Great Britain | 23/117 |

*Primary Examiner*—Edward Stern
*Attorney*—Griswold & Burdick and Richard W. Hummer

[57] ABSTRACT

A process for the clarification of the black liquor obtained in the acid leaching of titaniferous ores and titanium slag feed, which process comprises adding to the black liquor a water-soluble cationic polymer flocculant containing monomer units having the formula:

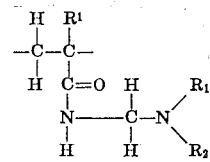

wherein $R'$ is hydrogen or methyl and $R_1$ and $R_2$ are alkyl groups, for example methyl or ethyl groups and preferably contain not more than four or five atoms.

14 Claims, No Drawings

METHOD FOR CLARIFYING TITANIUM SULPHATE SOLUTIONS

The present invention relates to a process for clarifying the "black liquor" obtained in the acid leaching of titaniferous ores and titanium slag feed.

In the production of titanium oxide from a titanium containing source, which is generally ilmenite ore and/or titanium slag feed, sulphuric acid is used to leach the titanium from the source to give a suspension, which, before settling, is generally termed "black liquor." The process of separating the residue of the titanium source from the suspension is generally known as "black liquor clarification."

According to the present invention there is provided a process for clarifying the black liquor obtained in the acid leaching of a titanium containing source which comprises adding to the black liquor a water-soluble cationic polymer flocculant containing monomer units having the formula:

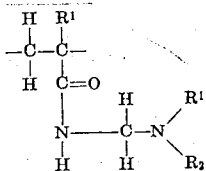

wherein $R^1$ is hydrogen or methyl, and $R_1$ and $R_2$ are alkyl groups, for example, methyl or ethyl groups, and preferably contain not more than four or five carbon atoms.

The water-soluble cationic polymer flocculant may be prepared by reacting together an acrylamide containing polymer, a secondary amine of the formula:

wherein $R_1$ and $R_2$ are each alkyl groups, and formaldehyde. Optimum results are obtained when the reaction is carried out to give substantially 100 percent conversion of the $NH_2$ sites of the polyacrylamide to $-NH - CH_2 - NR_1R_2$. Although a proportion of the acrylamide groups of the polyacrylamide may be hydrolyzed e.g. to sodium carbonylate groups, the best results are obtained when none of the acrylamide groups are hydrolyzed. An increase in the number of hydrolyzed acrylamide groups in the flocculant used in the process of the invention leads to an increase in the settling rate, but a decrease in the clarity of the supernatant liquid obtained.

The cationic polymer flocculant should preferably contain 50 mole percent of aminated acrylamide monomer units, although polymers containing as little as 10 percent aminated acrylamide monomer units may be used. In some instances polymers containing 80 or even 100 mole percent aminated acrylamide units are used. Preferably, the acrylamide polymer used in the process of the invention has a molecular weight between 1 million and 5 millions.

Examples of suitable acrylamide containing polymers are polymethacrylamide, copolymers of acrylamide with acrylic acid, methacrylic acid, alkali metal salts of the foregoing acids, styrene sulfonate, n-vinyl-pyrrolidone, N-vinyl-pyridine, 2-aminoethyl acrylate and copolymers of acrylamide or methacrylamide with up to 50 mole percent of water-insoluble monomers such as methyl acrylate, methyl methacrylate, acrylonitrile, styrene, vinyl methyl ether and vinyl acetate. The preferred cationic polymer flocculants for use in the practice of the present invention are based on the acrylamide polymers exemplified above.

The secondary amine used in the amination of the acrylamide polymer has the formula:

wherein $R_1$ and $R_2$ are alkyl groups, preferably containing not more than four or five carbon atoms. Preferred secondary amines are dimethylamine and diethylamine. These secondary amines may be used in the form of their acid salts, for example their hydrochlorides in the amination of the acrylamide containing polymer.

In the practice of the invention, the cationic water-soluble polymer flocculant is desirably mixed rapidly with the black liquor mineral suspension. Thus optimum results are achieved when high shear conditions exist at the black liquor. The agitation may, if required, be continued during subsequent floc building.

Preferably, the polymer flocculant is added as an aqueous solution having a concentration of 0.05 percent to 1 percent, for example, about 0.1 percent. It is suitably added to the black liquor just before the latter enters the clarifier.

Good results are obtained using the process of the present invention when the polymer flocculant is added in an amount of 25 to 150 grams, preferably 50 to 75 grams, of polymer flocculant per cubic meter of the black liquor.

In the manufacturing of titanium dioxide pigments by dissolving titanium-containing minerals in strong sulfuric acid for subsequent precipitation of $TiO_2$, two typical raw material sources are used, i.e. ilmenite whether it be concentrated or not and a slag coming from iron titaniferous of t:tan:Ferous iron ore.

Both minerals differ in titanium and iron content. In the process of clarification of the so called "black liquors " easiness of settling and clarification will also differ completely as well as the addition rates of synthetic or natural flocculation agents.

The invention is further illustrated by the following Examples.

EXAMPLE 1

A 100 ml sample of "black liquor" slurry coming from the sulfuric acid extraction of 100 percent Western Australian ilmenite preliminarily reduced by iron scrap, temperature 65°C, solid content 40 g/l, density of liquor 1.60, is poured into a 1 liter beaker, equipped with a mechanical stirrer. The stirrer is rotated at such a velocity as to create a 2 – 3 cm vortex in the beaker.

The polymer used in this Example is a water soluble cationic polymer flocculant prepared by reacting together an acrylamide containing polymer having the following characteristics:

Ratio acrylate to acrylamide groups:
4 – 7 percent
Viscosity of a 0.5 percent solution at pH3 at 25°C measured by an Ostwald capillary viscosimeter:
8 – 12 cps with a secondary amine of the formula:

and an aldehyde of the formula:

CH$_2$O

Molar ratio polymer to amine and aldehyde:
1 mole polymer
0.75 mole amine and aldehyde.

An aqueous solution of the polymer is diluted to an active polymer concentration of 0.5 percent by weight. An addition of 30 milliliters of the above solution (containing 100 mg of this diluted polymer) is injected into the black liquor drop by drop. When addition is completed a further 30 seconds stirring is provided at the same speed.

The flocculated slurry is poured into a 1 liter graduated cylinder and allowed to settle. The speed of settling is recorded. After 1 hour 100 ml of the supernatant liquid at the 700 ml mark is extracted and the solids concentration is measured.

The same technique is used at various polymer addition rates and results are tabulated in Table 1.

The settling rate is measured according to the standard technique i.e. by measuring the tangent in the free fall zone of the sedimentation curve obtained by plotting settled sledge volume versus time.

The clarity is measured by filtration of the 100 ml extracted supernatant liquid and by determination of the increased weight of the dry filter medium.
Units: mg/l: (polymer addition rate):
  mg 100 percent active polymer per liter slurry to be flocculated
  m/h (settling rate): speed at which flocculants settle into the cylinder
  mg/l (clarity): mg solids per liter of slurry.

TABLE 1

Australian ilmenite (100%)

| Polymer addition rate (100%) | Settling rate | Clarity |
|---|---|---|
| mg/l | m/h | mg/l after 1 hr. |
| 50 | 4 | 150 |
| 75 | 5.5 | 80 |
| 100 | 10 | 100 |
| 125 | 12 | 120 |

EXAMPLE 2

The same testing technique as used in Example 1 is applied on an industrial so called "black liquor" coming from the acid leaching of a titaniferrous slag having the following main characteristics:

| | |
|---|---|
| Temperature: | 60°C |
| Solid content: | 35 g/l |
| TiO$_2$ content: | 12.5 – 13% |
| Density of liquor: | 1.58 |

Tests were made with four different polymers covered by the present invention and respectively called A, B, C and D. Results are summarized in Table 2.

Polymer A corresponds to the polymer of Example 1.

Polymer B is an acrylamide containing polymer having the following characteristics: Ratio acrylate to acrylamide groups: 25 – 35 percent, viscosity of a 0.5 percent solution at pH7, 25°C, containing 4 percent by weight NaCl, measured by an Ostwald capillary viscosimeter: 12–16 cps. The reaction corresponds to that of polymer A.

Polymer C is prepared from the starting polymers and chemicals corresponding to polymer A with a molar ratio of polymer to amine and aldehyde of 1 : 1.

Polymer D is a copolymer of acrylamide and quaternary (2-trimethylamine)-ethylacrylate chloride.

TABLE 2

| Polymer | Addition rate mg/l (100%) | Settling rate m/h | Clarity |
|---|---|---|---|
| A | 50 | 9.3 | good |
| A | 40 | 9.3 | good |
| B | 50 | 17.5 | good |
| C | 50 | 9.7 | good |
| D | 50 | 5.2 | good |
| D | 75 | 8.5 | good |

The statement "good in clarity" means less than 120 mg/l solids after 1 h in the supernatant liquor according to the testing technique of Example 1.

EXAMPLE 3

The same testing technique as used in Example 1 was applied to a black liquor coming from the sulfuric acid leaching of a Norwegian ilmenite.
The results are summarized in Table 3.

TABLE 3

| Polymer | Addition rate mg/l (100%) | Settling rate m/h | Clarity |
|---|---|---|---|
| A | 10 | 3.0 | 150 Plant |
| A | 20 | 4.5 | 70 liquor No. 1 |
| A | 30 | 8.0 | 80 |
| A | 50 | 10.0 | – |
| B | 75 | 3.1 | 70 Plant |
| B liquor | 100 | 4.4 | 90 No.2 |

EXAMPLE 4

In a titanium dioxide pigment plant employing sulfuric acid leaching, using a blend of Australian ilmenite and slag as raw material the polymer according to Example 1 was tested on a larger scale.

characteristics of the black liquor:
Temperature:                    65°C
Solids content: 50 g/l TiO$_2$ content: 12%
Acid to Tio$_2$ ratio 1 to 2.

An experimental batch of polymer was diluted to a 0.5 percent active solids concentration. It was further mixed into the flow of black liquor in a 200 l tank provided with a mechanical agitator turning at 450 RPM and creating a small vortex on top of tank. The polymer was added into the high shear action zone of the propeller blades. From the tank the thus flocculated black liquor slurry was falling freely into the settling tanks.

Results are tabulated in Table 4.

TABLE 4

| Polymer addition rate mg/l (100%) ta | Concentration of overflow (after 2 h) mg/l | underflow % | Settling rate m/h |
|---|---|---|---|
| 40 | 60 | 25 | 2.5 |
| 60 | 40 | 29 | 2.5 |

The thickened underflow of this clarification and settling test is strongly flocculated and remains so during the whole washing or elutriation process. If needed very small additional amounts of the polymer can be added to increase the settling speed and clarity of the elutriated sludge and supernatant liquid.

In industrial practice small amounts of polymer of 5 – 10 mg/l can be added to the sludge during elutriation to provide an almost solid free (< 10 mg/l) supernatant liquid in the clarifiers.

We claim:

1. A process for the clarification of the black liquor obtained in the acid leaching of a titanium containing source which process comprises mixing with the black liquor under high shear conditions an amount of a water-soluble cationic polymer flocculant containing monomer units having the formula

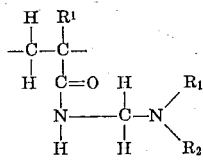

wherein $R^1$ is hydrogen or methyl, and $R_1$ and $R_2$ are alkyl groups to provide from 25 to 150 grams of the polymer flocculant per cubic meter of the black liquor.

2. A process as claimed in claim 1 wherein $R_1$ and $R_2$ individually do not contain more than five carbon atoms.

3. A process as claimed in claim 1 wherein $R_1$ and $R_2$ individually are methyl or ethyl groups.

4. A process as claimed in claim 1 wherein the water-soluble cationic polymer flocculant is prepared by reacting together an acrylamide-containing polymer, a secondary amine of the formula: wherein $R_1$ and $R_2$ are each alkyl groups, and formaldehyde.

5. A process as claimed in claim 4 wherein the reaction is carried out to give substantially 100 percent conversion of the NH$_2$ sites of the polyacrylamide to — NH–CH$_2$–NR$_1$R$_2$.

6. A process as claimed in claim 4 wherein the secondary amine alkyl groups individually do not contain more than five carbon atoms.

7. A process as claimed in claim 4 wherein the secondary amine employed is dimethylamine or diethylamine.

8. A process as claimed in claim 4 wherein the acrylamide-containing polymer is polymethacrylamide, a copolymer of acrylamide with acrylic acid, methacrylic acid, an alkali metal salt of the foregoing acids, styrene sulfonate, N-vinyl-pyrrolidone, N-vinyl-pyridine, or, a copolymer of acrylamide of methacrylamide with up to 50 mole percent of methyl acrylate, methyl methacrylate, acrylonitrile, styrene, vinyl methyl ether or vinyl acetate.

9. A process as claimed in claim 1 wherein the water-soluble cationic polymer flocculant contains from 10 to 100 mole percent aminated acrylamide monomer units.

10. A process as claimed in claim 1 wherein the water-soluble cationic polymer flocculant contains 50 mole percent aminated acrylamide monomer units.

11. A process as claimed in claim 4 wherein the acrylamide polymer used has a molecular weight between 1 million and 5 millions.

12. A process as claimed in claim 1 wherein the high shear conditions are maintained during subsequent floc building.

13. A process as claimed in claim 1 wherein the water-soluble polymer flocculant is added to the black liquor as an aqueous solution having a concentration of 0.05 to 1 weight percent.

14. A process as claimed in claim 1 wherein the water-soluble polymer flocculant is added to the black liquor in an amount of from 50 to 75 grams of polymer flocculant per cubic meter of the black liquor.

* * * * *